(12) United States Patent
Hollick (10) Patent No.: US 8,827,779 B2
(45) Date of Patent: Sep. 9, 2014

(54) METHOD AND APPARATUS FOR COOLING VENTILATION AIR FOR A BUILDING

(75) Inventor: John C. Hollick, King City (CA)

(73) Assignee: Hollick Solar Systems Limited, King City, Ontario (CA)

( * ) Notice: Subject to any disclaimer, the term of this patent is extended or adjusted under 35 U.S.C. 154(b) by 968 days.

(21) Appl. No.: 11/436,432

(22) Filed: May 18, 2006

(65) Prior Publication Data

US 2007/0277811 A1   Dec. 6, 2007

(51) Int. Cl.
| | |
|---|---|
| F24F 7/00 | (2006.01) |
| F25B 23/00 | (2006.01) |
| F24F 7/013 | (2006.01) |
| F24F 5/00 | (2006.01) |
| F24J 2/04 | (2006.01) |

(52) U.S. Cl.
CPC .............. F24F 7/013 (2013.01); *Y02B 10/20* (2013.01); F25B 23/003 (2013.01); *F24F 5/0046* (2013.01); *Y02B 10/24* (2013.01); *F24F 2005/0064* (2013.01); *Y02B 30/92* (2013.01); *F24J 2/045* (2013.01); F24F 5/0075 (2013.01)
USPC ....................................................... 454/185

(58) Field of Classification Search
USPC ................. 454/185, 186, 366, 365, 367, 364; 52/302.1; 126/621, 622, 623, 629, 628
See application file for complete search history.

(56) References Cited

U.S. PATENT DOCUMENTS

| | | | | |
|---|---|---|---|---|
| 3,949,732 | A | | 4/1976 | Reines |
| 3,983,929 | A | * | 10/1976 | Thomason et al. .......... 165/48.2 |
| 4,062,347 | A | * | 12/1977 | Jensen ........................... 126/591 |
| 4,207,868 | A | * | 6/1980 | Peterson ....................... 126/620 |
| 4,244,519 | A | * | 1/1981 | Zornig et al. ................ 126/591 |
| 4,284,072 | A | * | 8/1981 | McKaveney .................. 126/661 |
| 4,295,415 | A | * | 10/1981 | Schneider, Jr. .............. 454/185 |
| 4,498,526 | A | * | 2/1985 | Arenas ............................ 165/45 |
| 4,774,932 | A | | 10/1988 | Hollick |

(Continued)

FOREIGN PATENT DOCUMENTS

| | | |
|---|---|---|
| DE | 3625454 | 1/1987 |
| DE | 29800260 | 2/1999 |

(Continued)

OTHER PUBLICATIONS

Translation of JP10140686.*

(Continued)

*Primary Examiner* — Steven B McAllister
*Assistant Examiner* — Brittany Towns
(74) *Attorney, Agent, or Firm* — Tarolli, Sundheim, Covell & Tummino LLP (57) ABSTRACT

An apparatus for cooling ventilation air for a building, includes a radiating panel having an emissive surface for use on the building such that the emissive surface of the panel is directed skyward and exposed to ambient air. The radiating panel defines an air collection space between itself and the building and has a plurality of air openings for the ambient air to pass through the openings to the air collection space. A passageway extends between the air collection space and an interior of the building and is located for passage of cooled ambient air from the air collection space into the interior of the building. A fan is located for moving the cooled ambient air from the air collection space through the passageway to the interior of the building.

25 Claims, 6 Drawing Sheets

(56) References Cited

U.S. PATENT DOCUMENTS

| | | | |
|---|---|---|---|
| 4,899,728 A * | 2/1990 | Peter et al. | 126/622 |
| 4,934,338 A | 6/1990 | Hollick et al. | |
| 4,967,729 A * | 11/1990 | Okumura | 126/632 |
| 6,780,099 B1 * | 8/2004 | Harper | 454/186 |
| 6,903,261 B2 * | 6/2005 | Habraken et al. | 136/246 |
| 6,978,826 B2 * | 12/2005 | Matsubara | 165/48.2 |
| 2002/0117166 A1 * | 8/2002 | Okumura | 126/633 |
| 2004/0216410 A1 * | 11/2004 | Shatzky | 52/464 |
| 2005/0252507 A1 | 11/2005 | Hollick | |
| 2007/0130850 A1 * | 6/2007 | Miekka | 52/198 |

FOREIGN PATENT DOCUMENTS

| | | |
|---|---|---|
| DE | 19840362 | 3/2000 |
| DE | 100 39 556 A1 | 2/2002 |
| DE | 10039556 | 2/2002 |
| GB | 1 441 456 | 6/1976 |
| JP | U 1993-000803 | 1/1993 |
| JP | 09-061006 | 3/1997 |
| JP | 9061006 | 3/1997 |
| JP | 9-235845 | 9/1997 |
| JP | 10-140686 | 5/1998 |
| JP | 10140686 | 5/1998 |
| JP | 11-336210 | 12/1999 |
| JP | 11336210 | 12/1999 |
| JP | 2002-88994 | 3/2002 |
| WO | WO 03080956 A1 * | 10/2003 |
| WO | 2007134423 | 11/2007 |

OTHER PUBLICATIONS

Excerpt entitled "Cooling by Nocturnal Radiation and Evaporation", ASHRAE from pages marked "33.17" of 2007 Handbook—Heating, Ventilating, and Air-Conditioning, SI Edition by the American Society of Heating, Refrigerating and Air-Conditioning Engineers, Inc., of Atlanta, Georgia.

Bernard Haurwitz, "Nocturnal Radiation and the Cooling of the Surface Layers", *Dynamic Meterology*, McGraw-Hill Book Company of New York, New York, 1941, p. 106.

Daniel S. Parker, "Theoretical Evaluation of the NightCool Nocturnal Radiation Cooling Concept", Submitted to: U.S. Department of Energy. FSEC-CR-1502-05. Apr. 2005, available at http://www.baihp.org/PUBS/nightcool/index.htm.

English translation of a Japanese Office Action dated Jan. 17, 2012 received in connection with corresponding Japanese Application No. 2009-510239 (3 pgs.).

* cited by examiner

METHOD AND APPARATUS FOR COOLING VENTILATION AIR FOR A BUILDING

FIELD OF THE INVENTION

The present invention relates to the provision of ventilation air for buildings and to cooling of the ventilation air prior to introduction into a building.

BACKGROUND OF THE INVENTION

Commercial, industrial, domestic and apartment buildings require ventilation. It is common for natural leakage around doors, wall-ceiling joints, etc. found in standard building construction to allow sufficient air to enter the building. A pressure drop from the exterior to the interior of the building can arise from many factors, such as high winds, exhaust fans and combustion air for fuel-burning furnaces. This tends to draw outside air into the building through cracks or openings.

The conventional approach to providing ventilation by simply allowing air flow through leaks around doors and joints suffers from the disadvantages that the amount and the temperature of ventilation air is not controlled. This lack of control of ventilation air is typically made up for by providing additional heat during the heating season or by providing additional cooling by way of air conditioning and fans during the warm season or in hot climates.

U.S. Pat. Nos. 4,899,728 and 4,934,338 issued Feb. 13, 1990 and Jun. 19, 1990, respectively, disclose the use of a solar panel to heat fresh make-up (ventilation) air prior to introduction into a building. These systems are efficient for heating large volumes of air per surface area of solar panel. The systems described in these patents, however, address only heating of ventilation air and fail to address cooling which is desirable during the warm season or in hot climates.

SUMMARY OF THE INVENTION

According to one aspect of an embodiment, there is provided an apparatus for cooling ventilation air for a building, includes a radiating panel having an emissive surface for use on the building such that the emissive surface of the panel is directed skyward and exposed to ambient air. The radiating panel defines an air collection space between itself and the building and has a plurality of air openings for the ambient air to pass through the openings to the air collection space. A passageway extends between the air collection space and an interior of the building and is located for passage of cooled ambient air from the air collection space into the interior of the building. A fan is located for moving the cooled ambient air from the air collection space through the passageway to the interior of the building.

According to another aspect of an embodiment, there is provided a method of cooling ventilation air for a building. The method includes providing on a surface of a building, a radiating panel having an emissive surface such that the emissive surface of the panel is directed skyward and exposed to ambient air. The panel defines an air collection space between itself and the building and includes a plurality of air openings for the ambient air to pass through the openings to the air collection space. The method further includes drawing the ambient air through the air openings and into the air collection space, cooling the ambient air by transferring heat to the panel and radiating heat from the panel to the sky, to provide cooled ventilation air and withdrawing the cooled ventilation air through an air inlet and pushing the cooled ventilation air into the building.

Advantageously, air that is drawn into the air collection space between the panel and the building, is cooled by heat transfer to the panel and radiation of heat from the panel to the sky. Thus, the ventilation air provided to the building is cooled compared to ambient air temperature. In one embodiment, horizontal Z-bars are used to support the panel on a sloped roof. Some condensation that forms on the backside of the panel runs downwardly to a Z-bar and then drops off and to the roof of the building where the water runs off. Advantageously, less water remains on the backside of the panel, leaving less water to cool down, allowing for cooling of the air.

In another embodiment, a heating passage is located for passage of heated ambient air from the collection space into the interior of the building. Thus, ambient air heated by solar radiation is directed into the building during the heating months while cooled air is directed into the building during the cooling months.

BRIEF DESCRIPTION OF THE DRAWINGS

The present invention will be better understood with reference to the following drawings and to the description, in which.

DETAILED DESCRIPTION OF THE PREFERRED EMBODIMENT

The Stefan-Boltzmann Law of Radiation provides a calculation of heat loss from a warm surface to a colder surface. Roofs of buildings exposed to the clear night sky experience a temperature drop below that of ambient air temperature due to radiation heat loss from the roof to the cool night sky. The cooling rate in a clear, dry climate is approximately 75 W/m$^2$ of roof. The cooling rate reduces with higher humidity and cloud cover. The night cooling effect begins when the heat loss exceeds the solar heat gain, typically beginning prior to dusk and lasting until after dawn. Thus, approximately 10 to 12 hours of potential cooling to the night sky, exists each day.

Figure 1:
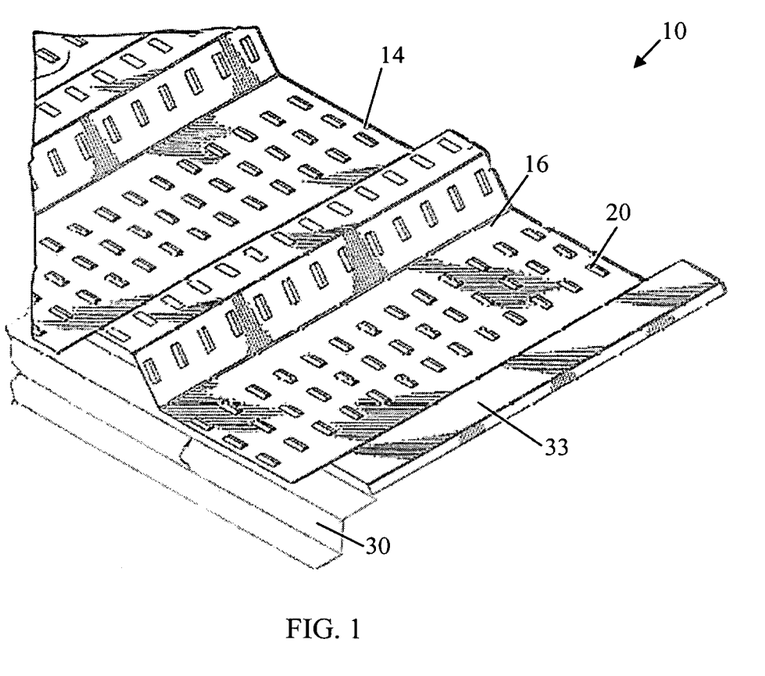
FIG. 1 is a perspective view of a portion of an apparatus for cooling ventilation air for a building according to one embodiment of the present invention.
Figure 2:
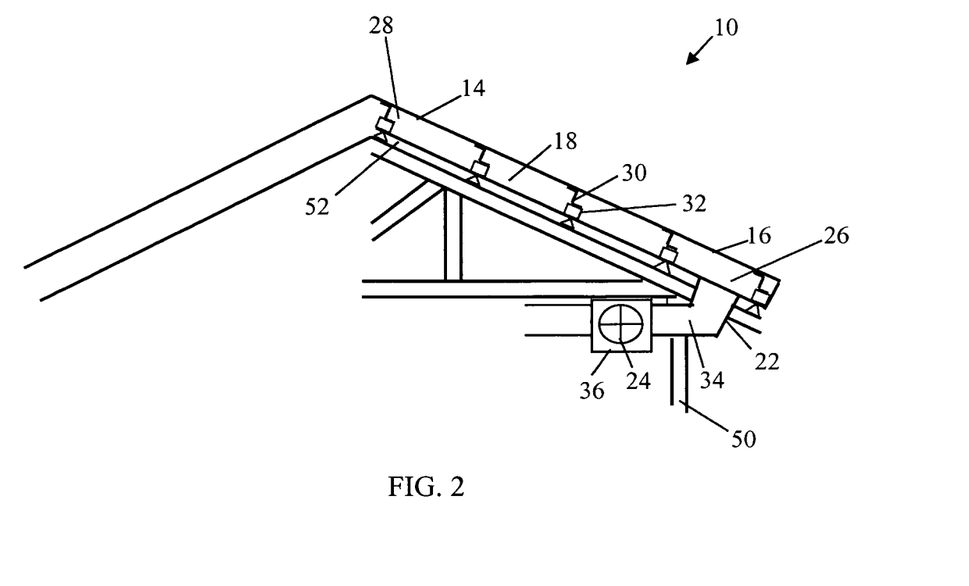
FIG. 2 is a sectional view of the apparatus of FIG. 1.

Reference is made to FIGS. 1 and 2 to describe an apparatus for cooling ventilation air for a building. The apparatus is indicated generally by the numeral 10 and the building is indicated generally by the numeral 50. The apparatus 10 includes a radiating panel 14 having an emissive surface 16 for use on the building 50 such that the emissive surface 16 of the panel 14 is directed skyward and exposed to ambient air. The radiating panel 14 defines an air collection space 18 between itself and the building 50 and has a plurality of air inlet openings 20 for the ambient air to pass through the openings 20 to the air collection space 18. A passageway 22 extends between the air collection space 18 and an interior of the building 50 and is located for passage of cooled ambient air from the air collection space 18 into the interior of the building 50. A fan 24 is located for moving the cooled ambient air from the air collection space 18 through the passageway 22 to the interior of the building 50.

One embodiment of the apparatus 10 for cooling ventilation air for a building 50 will now be further described with continued reference to FIGS. 1 and 2. The apparatus 10 is shown fixed to a roof 52 of the building 50. As shown, the radiating panel 14, referred to herein as the panel 14, is a corrugated metal panel with a highly emissive or radiating surface 16 and an opposing surface 17 with low absorption and emissivity. Thus, one surface has a higher emissivity rate than the other surface. The panel 14 is fixed to the outer surface of the roof 52 with the highly emissive surface 16 facing skyward and the less emissive surface 17 (also referred to herein as the downward facing surface 17) facing the roof 52 of the building 50. The roof 52 in the present embodiment is angled downwardly from an apex near the center of the roof 52 toward the outer edge and portions of the corrugated panel 14 extend generally parallel with the roof 52. Thus, the panel 14 includes a lower portion 26 proximal the outer edge of the roof 52 and an upper portion 28 proximal the apex of the roof 52. In the present embodiment, the panel 14 covers the majority of the roof 50 to provide shade to the roof 50.

The panel 14 is fixed to the outer surface of the roof 52 by intermediary Z-section bars 30 mounted on hat clips 32. Referring to FIG. 2, the hat clips 32 are secured to the outer surface of the roof 52 using suitable fasteners. The clips 32 are located in horizontal rows and are spaced apart so as to permit air flow between the clips. The Z-section of each of the bars 30 is shown in FIG. 2. As shown, these bars 30 are fixed to the clips 32 and to the panel 14 such that the central web portion of the Z-section bars further spaces the panel 14 from the roof 52. Thus, one edge of the Z-section bar is seated against the spaced apart clips 32, while the other edge of the bar is seated against the panel 14.

As indicated above, the panel 14 includes the air inlet openings 20 distributed throughout the surface of the panel 14. The air inlet openings 20 provide a travel path for ambient air to enter the air collection space 18 from the exterior. In the present embodiment, the air inlet openings 20 are distributed generally uniformly over the surface of the panel 14 with the exception of the immediate surrounding area where the passageway 22 meets the air collection space 18. The air inlet openings are formed by rotary punching slits in the panel 14 such that gaps at the end of the slits provide the air inlet openings 20. The air inlet openings 20 are small to aid in filtering air prior to entry into the apparatus for cooling ventilation air.

The perimeter of the panel 14 is closed off by a metal frame 33 that surrounds the panel 14. The metal frame 33 is sealed to the roof 52 around the sides and the top of the panel 14, using, for example, silicon caulking. The bottom of the metal frame is not sealed so as to allow rain or moisture to run off of the roof 52.

An air duct 34 is in communication with the air collection space 18, extending from a lower portion of the air collection space 18 (at a lower portion of the sloped roof 52), passing through an exterior wall of the building 50, and providing the passageway 22 for cooled ambient air from the air collection space 18 to enter the interior of the building 50. The air duct 34 extends into the building 50 to provide cooled outside air to the interior of the building 50, through openings in the air duct 34.

A fan housing 36 is connected along the air duct 34 and includes the fan 24 for moving air from the air collection space 18 into the interior of the building. In the present embodiment, the fan housing 36 is located on the roof 52, exterior to the building 50. Motorized dampers in the fan housing 36 are adjustable to allow air from the interior of the building to be mixed with cooled air from the air collection space 18. The fan 24 is typically sized to meet ventilation requirements and to inhibit negative air pressure within the building. A positive air pressure can be achieved by introducing the cooled air into the building through the air duct 34. Interior air leaves the building through openings and cracks. In the present embodiment, the fan 24 is a variable speed fan that is controlled by a controller dependent on the temperature of the incoming air. Thus, when the incoming air is above room temperature, the fan 24 runs at low speed. When the temperature of the incoming air is below room temperature, the fan speed increases to provide both ventilation air and cooling.

In use, the apparatus 10 for cooling ventilation air is located on the roof 52 of the building 50. Ambient air enters the air collection space 18 through the air inlet openings 20 in the panel 14, where the air is cooled. As the air in the air collection space 18 cools, warm air in the air collection space 18 rises while the cool air in the air collection 18 space falls. Thus, the coolest air in the air collection space 18 naturally falls toward the lower portion of the air collection space 18, where the air is withdrawn from the air collection space 18 by the fan 24, through the passageway 22 provided by the air duct 34 and into the building 50, thereby providing cooled ventilation air to the building 50.

As cooling of the air occurs in the air collection space 18, any water droplets that form on the downward facing surface of the panel 14, pulled downwardly by the force of gravity and thus travel down the slope of the panel 14. Travel of the water is interrupted by the Z-section bars 30 extending generally horizontally and fixed to the downward facing surface 17 of the panel 14. When the water meets the Z-section bar, the water drops off the panel 14 and down to the roof 52 of the building 50, where the water can then run off. Thus, some of the water that condenses on the downward facing surface 17 of the panel 14 runs off leaving less water to cool down. Further, during the daytime, the sun aids in drying the air collection space.

Figure 3:
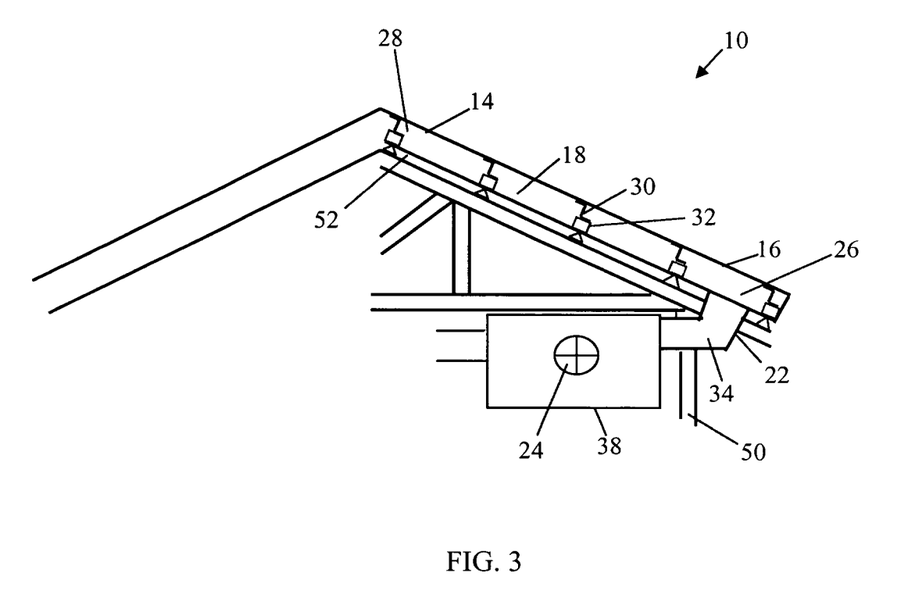
FIG. 3 is a sectional view of an apparatus for cooling ventilation air for a building according to another embodiment of the present invention.

Reference is now made to FIG. 3 to describe another embodiment. The present embodiment is similar to the first described embodiment and therefore is not described again in detail. Unlike the first embodiment, however, a cooling unit 38 in the form of an air conditioner is provided and the fan 24 is located within the cooling unit. Cooled air that is withdrawn from the air collection space 18 and into the air duct 34 is passed to the cooling unit for further cooling before being introduced to mix with air in the interior of the building, thereby providing further cooling. The cooling unit 38 also includes a dehumidifier for removing some of the moisture from the air entering the building. The dehumidifier is useful in humid climates.

Figure 4:
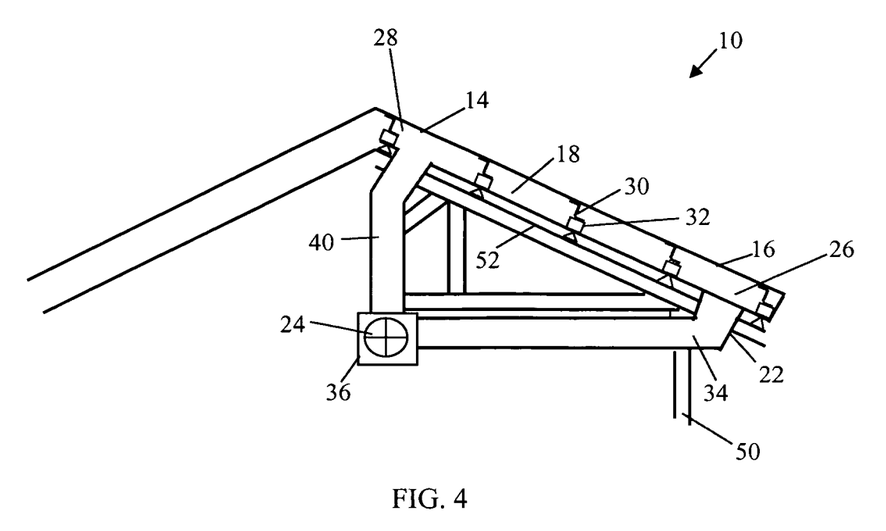
FIG. 4 is a sectional view of an apparatus for cooling ventilation air for a building according to still another embodiment of the present invention.

Reference is now made to FIG. 4 to describe yet another embodiment. Again the present embodiment includes many similar features to the first described embodiment and therefore further description of these features is not necessary. In the present embodiment, the emissive surface 16 of the panel 14 is coated with a medium colored paint (between dark and white) to provide a heat absorbent surface. The panel 14 therefore acts as to heat the air in the air collection space 18 during the daylight hours.

A second air duct 40 is in communication with the air collection space 18, extending from an upper portion of the air collection space 18 (at an upper portion of the sloped roof 52), to the fan 24, and providing a second passageway, this second passageway for heated ambient air from the air collection space 18 to enter the interior of the building 50. The first and second air ducts 34, 40 include dampers to direct air flow to the fan and into the building 50. Thus, air is selectively drawn from the air collection space 18 depending on time of day or heating or cooling needs.

In use, the apparatus 10 of the present embodiment is used for cooling ventilation air during the cooling (or summer) months. The apparatus 10 of the present embodiment, however, is also used during the heating (or winter) months for heating ventilation. The air in the air collection space 18 is heated by a combination of solar heat transmitted by conduction through the panel 14 and by heat escaping from the inside of the building 50, through the roof 52. As indicated above, warm air in the air collection space 18 rises while the cool air in the air collection 18 space falls. Thus, the second air duct 40 is located to remove air from the upper portion of the air collection space. The heated air is then withdrawn from the air collection space 18 through the second air duct 40 by the fan 24 and is introduced into the building 50. The use of the coating of heat absorbent paint permits daytime heating while still permitting night time cooling when the sun is not up.

The present invention has been described by way of examples. Modifications and variations to the above-described embodiments are possible. For example, while the first described embodiment refers to a uniform distribution of air inlet openings, air flow openings can be unevenly distributed, for example, by having fewer air flow openings at the lower portion of the panel, close to where the air duct 34 opens into the air collection space. Further, the density of air inlet openings can increase with distance from the air duct 34. Also, the size of the air inlet openings can increase with distance from the air duct 34. While the air duct 34 for providing cooled air to the building, is described as entering through a side wall of the building, it is also contemplated that this air duct can enter through the roof of the building.

Figure 5:
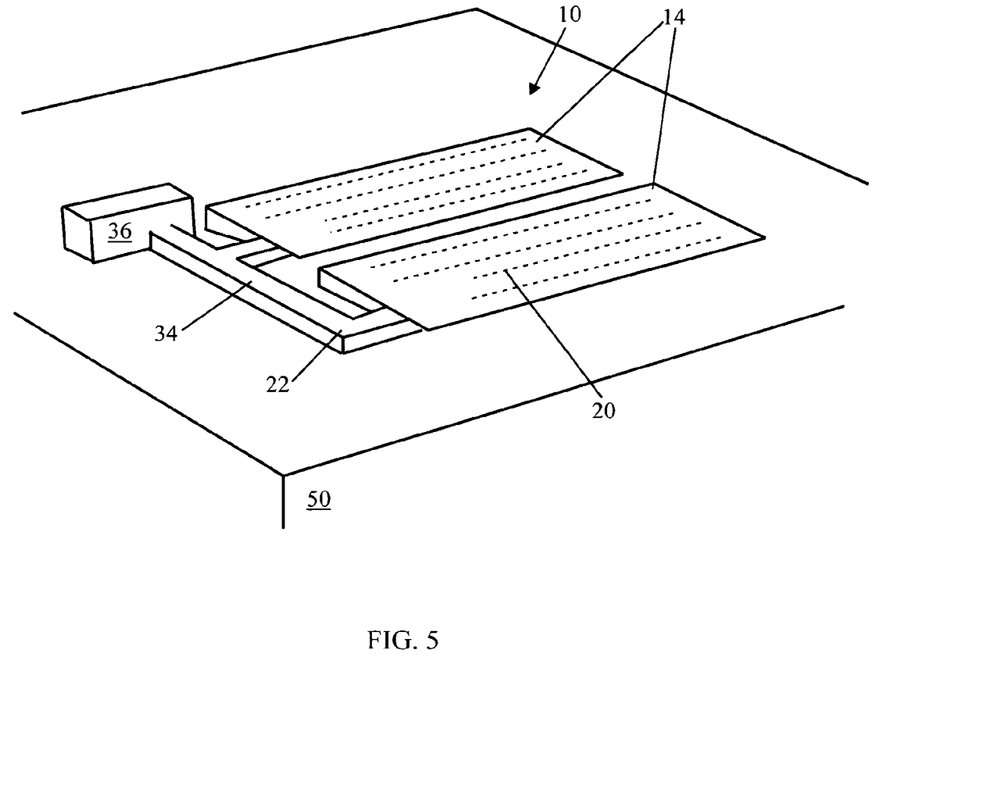
FIG. 5 is a perspective view of an apparatus for cooling ventilation air for a building according to yet another embodiment of the present invention.

While the apparatus for cooling ventilation air for a building has been shown and described on a sloped roof. The apparatus can also be used on a flat roof, as shown for example in FIG. 5 which shows radiating panels 14 with several air openings 20 to permit air flow into the air collection space defined by the radiating panel on the roof 52 of the building 50. In the present embodiment, the radiating panels 14 are sloped in relation to the roof 52 such that the air is drawn off into the passageway 22 at a lower level of the air collection space. Since hot air rises, hot air moves toward the uppermost part of the radiating panels 14 or out the openings 20. The cooler air falls toward the passageway 22 where it is drawn off when in use. As shown, there are no air openings at the point where the air duct 34 meets the air collection space. Also, in the present embodiment, the fan housing 36 (which includes the fan) is located on the roof 52.

Figures 6, 7:
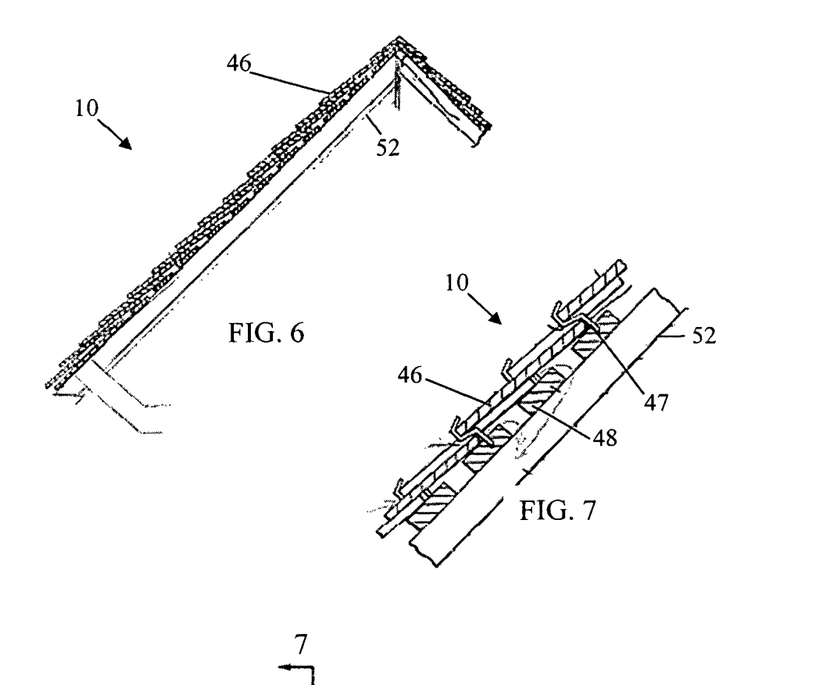
FIG. 6 is a sectional side view of an apparatus for cooling ventilation air for a building according to another embodiment of the present invention.
FIG. 7 is a partial sectional side view of the apparatus of FIG. 6, drawn to a larger scale.
Figure 8:
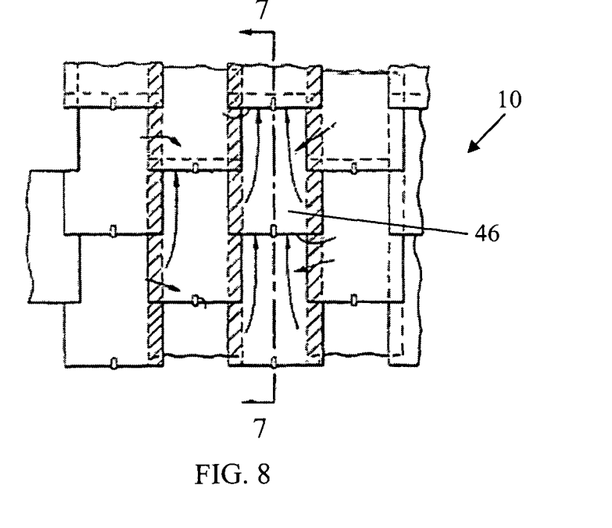
FIG. 8 is a partial top view of the apparatus of FIG. 6, drawn to a larger scale.

Other alternatives are also possible. For example, the air inlet openings can be formed in any suitable manner. The openings can be in the form of slits as described, or holes or gaps between adjacent and overlapping roof tiles. Referring to FIGS. 6 to 8, a radiating panel 14 that is made up of overlapping roof tiles 46 is shown. In this embodiment, ventilation air passes through a gap under each tile, around the tile and then down between vertical supports 47 to which horizontal supports 48 are fixed. The horizontal supports 48 are fixed to the roof 52 of the building 50. It is also contemplated that the overlapping tiles that are used are photovoltaic panels for producing electricity during the day time.

It will also be appreciated that the heated air in the third-described embodiment can be further heated prior to mixing with air inside the building 50. It will also be appreciated that rather than using a single fan in the third described embodiment in which heating of ventilation air is provided, a second fan housing and second fan can be used for drawing air in. Also, the use of the hat clips and Z bars is described herein for exemplary purposes only. Other attachment means are contemplated. For example, on some roofs, vertical Z bars can be used rather than clips, for example, if a certain distance of the roof is to be spanned or if roof supports are not in line with a clip mounting position. The vertical bars are positioned to allow air to move horizontally towards the passageway. The vertical bar under the horizontal bar stops short of the lower roof line to allow air to move horizontally towards the fan inlet.

It will be appreciated that the size of the radiating surface of the panel and the flow rate controlled by the fan are related. For example, the flow rate can be determined based on the size of the radiating surface of the panel and the maximum cooling rate for air passing through the openings. Alternatively, the size of the panel can be determined based on the flow rate and the maximum cooling rate for air passing through the openings.

Still other modifications and variations to the embodiments described herein may occur to those skilled in the art. All such modifications and variations are believed to be within the sphere and scope of the present invention.

What is claimed is:

1. An apparatus for cooling ventilation air for a building, comprising:
   a radiating panel assembly comprising a plurality of radiating panels, said radiating panel assembly having an emissive surface for use on said building such that said emissive surface of said radiating panel assembly is directed skyward at night, such that said radiating panel assembly is cooled due to radiation heat loss from said radiating panel assembly to a cool night sky, and ambient air proximal to said radiating panel assembly is cooled by transferring heat to said radiating panel assembly which radiates said heat via said radiation heat loss to said cool night sky, and said radiating panel assembly defines an air collection space between itself and a skyward facing portion of said building, said radiating panel assembly having a plurality of air openings for ambient air cooled by said radiating panel to pass through the plurality of air openings to the air collection space;
   a passageway between said air collection space and an interior of said building and located for passage of cooled ambient air from said air collection space into said interior of said building; and
   a fan located for moving said cooled ambient air from said air collection space to a lower portion of said air collection space and through said passageway to said interior of said building.

2. The apparatus according to claim 1, wherein said plurality of radiating panels include a low absorption rate back surface, opposite said emissive surface for inhibiting heat gain from a roof of said building.

3. The apparatus according to claim 1, wherein the emissivity rate of a back surface of said plurality of radiating panels is lower than the emissivity rate of said emissive surface.

4. The apparatus according to claim 1, wherein said plurality of radiating panels comprise corrugated panels.

5. The apparatus according to claim 1, wherein said radiating panel assembly is located to cover a roof of said building thereby providing shade for said roof, and said air collection space is disposed between said radiating panel and said roof.

6. The apparatus according to claim 1, wherein said radiating panel assembly is fixed to said building by intermediary, generally horizontal bars.

7. The apparatus according to claim 6, wherein said generally horizontal bars comprise generally horizontal Z-bars.

8. The apparatus according to claim 7, wherein said Z-bars are fixed to clips which are, in turn, fixed to said building.

9. The apparatus according to claim 1, wherein said fan comprises a cooling unit for further cooling said cooled ventilation air.

10. The apparatus according to claim 9, wherein said cooling unit includes a dehumidifier for removing moisture from said cooled ambient air.

11. The apparatus according to claim 1, further comprising a second passageway between said air collection space and an interior of said building and located for passage of heated ambient air from said air collection space into said interior of said building, said heated ambient air heated during daylight hours.

12. The apparatus according to claim 11, further comprising a second fan located for moving said heated ambient air from said air collection space through said second passageway to said interior of said building.

13. The apparatus according to claim 1, wherein said passageway is located at a lower portion of a sloped roof.

14. The apparatus according to claim 13, further comprising:
a second passageway between said air collection space and an interior of said building for passage of heated ambient air from said air collection space into said interior of said building, said second passageway located at an upper portion of said sloped roof, said heated ambient air heated during daylight hours.

15. The apparatus according to claim 1, wherein said air openings comprise at least one of:
slits in said plurality of radiating panels;
holes in said plurality of radiating panels; and
gaps between at least one of overlapping radiating panels and adjacent radiating panels.

16. The apparatus according to claim 1, wherein said radiating panel comprises a plurality of photovoltaic panels for producing electricity.

17. A method of cooling ventilation air for a building, comprising:
providing on a surface of a building, a radiating panel assembly comprising a plurality of radiating panels, said radiating panel assembly having an emissive surface such that said emissive surface of said radiating panel assembly is directed skyward, such that at night said radiating panel assembly is cooled due to radiation heat loss from said radiating panel assembly to a cool night sky, and ambient air proximal to said radiating panel assembly is cooled by transferring heat to said radiating panel assembly which radiates said heat via said radiation heat loss to said cool night sky, and said radiating panel assembly defines an air collection space between itself and a skyward facing portion of said building, said radiating panel assembly having a plurality of air openings for said ambient air cooled by said radiating panel assembly to pass through the plurality of air openings to the air collection space;
drawing said ambient air through said air openings and into said air collection space;
cooling said ambient air by transferring heat to said radiating panel and radiating heat from said panel to the sky, to provide cooled ventilation air;
withdrawing the cooled ventilation air from a lower portion of said air collection space and through an air inlet and transferring said cooled ventilation air into said building.

18. The method according to claim 17, wherein providing said radiating panel assembly comprises providing a low absorption rate back surface, opposite said emissive surface for inhibiting heat gain from a roof of said building.

19. The method according to claim 17, wherein providing said radiating panel assembly comprises providing a back surface with an emissivity rate that is lower than the emissivity rate of said emissive surface.

20. The method according to claim 17, further comprising fixing said radiating panel to said building by intermediary, generally horizontal bars.

21. The method according to claim 17, further comprising further cooling said cooled ventilation air in a cooling unit.

22. The method according to claim 17, further comprising dehumidifying said cooled ventilation air.

23. The method according to claim 17, further comprising:
heating said ambient air with solar heat from said radiating panel assembly to provide heated ventilation air during a heating season, said heated ventilation air heated during daylight hours; and
withdrawing the heated ventilation air through a second air inlet and transferring said heated ventilation air into said building during heating periods.

24. An apparatus for cooling ventilation air for a building, comprising:
a radiating panel assembly comprising a plurality of radiating panels, said radiating panel assembly being mountable on said building, said radiating panel assembly comprising an emissive surface exposed to ambient air, said emissive surface enabled to be directed skyward, when said radiating panel assembly is mounted to said building, such that said radiating panel assembly is cooled due to radiation heat loss from said radiating panel assembly to a cool night sky wherein ambient air proximal to said radiating panel assembly is cooled by transferring heat to said radiating panel assembly which radiates said heat via said night cooling, said radiating panel assembly defining an air collection space between itself and a skyward facing portion of said building when mounted thereupon, said radiating panel assembly further comprising a plurality of air openings for said ambient air cooled by said radiating panel assembly to pass there through to said air collection space,
wherein a lower portion of said air collection space is connectable to a passageway in communication with an interior of said building, said passageway in communication with a fan for moving cooled ambient air from said air collection space to said lower portion of said air collection space and through said passageway to said interior of said building.

25. The apparatus according to claim 1, wherein said air openings comprise at least one of slits, holes, and gaps in said radiating panel.

* * * * *